Figure 1:
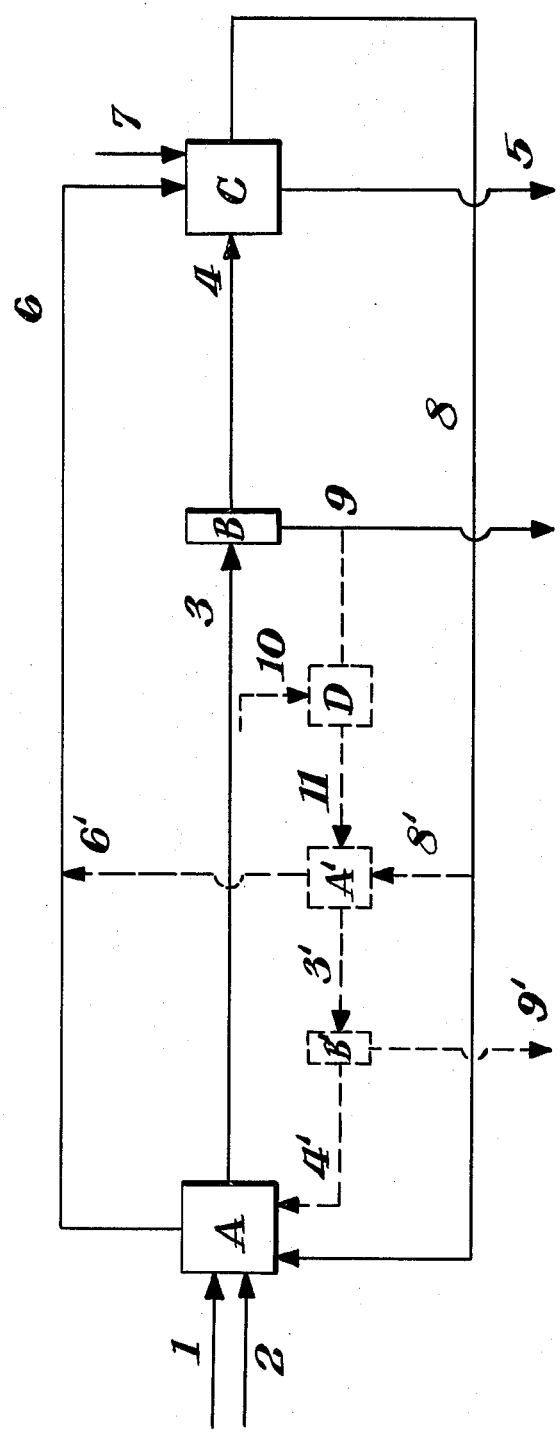

United States Patent [19]

Wojtech et al.

[11] 3,996,336

[45] Dec. 7, 1976

[54] PURIFICATION OF PHOSPHORIC ACID

[75] Inventors: Bernhard Wojtech, Bad Soden; Klaus-Peter Ehlers, Erftstadt Lechenich; Wolfgang Scheibitz, Cologne, all of Germany

[73] Assignee: Hoechst Aktiengesellschaft, Frankfurt am Main, Germany

[22] Filed: July 1, 1975

[21] Appl. No.: 592,188

[30] Foreign Application Priority Data

July 6, 1974 Germany ............................ 2432472
July 25, 1974 Germany ............................ 2435789

[52] U.S. Cl. ............................................. 423/321 S
[51] Int. Cl.² ......................................... C01B 25/16
[58] Field of Search ..................... 423/321, 321 S

[56] References Cited

UNITED STATES PATENTS

| | | | |
|---|---|---|---|
| 1,929,441 | 10/1933 | Milligan | 423/321 S |
| 1,981,145 | 11/1934 | Keller | 423/321 S |
| 3,318,661 | 5/1967 | Schallert et al. | 423/321 S |
| 3,764,657 | 10/1973 | Frankenfeld | 423/321 S |

FOREIGN PATENTS OR APPLICATIONS

| | | | |
|---|---|---|---|
| 1,427,531 | 6/1966 | France | 423/321 S |
| 1,020,071 | 2/1966 | United Kingdom | 423/321 S |
| 1,050,961 | 12/1966 | United Kingdom | 423/321 S |

OTHER PUBLICATIONS

Ind. & Eng. Chem., Mod. Wet Process Using Solvent Extr, Huaag, 1/61.

*Primary Examiner*—Oscar R. Vertiz
*Assistant Examiner*—Eugene T. Wheelock
*Attorney, Agent, or Firm*—Connolly and Hutz

[57] ABSTRACT

Phosphoric acid is purified. To this end, it is dissolved in an organic solvent completely miscible with water. More particularly, the phosphoric acid is mixed with a solvent having a boiling point higher than that of water or higher than that of the resulting azeotrope; the resulting solution is heated to temperatures between the boiling point of water or the azeotrope and that of the solvent for as long a period as necessary to distillatively free the solution from the bulk of uncombined water therein; and the phosphoric acid solution is separated from residue.

6 Claims, 2 Drawing Figures

The Water Content and the Boiling Temperature of Water-Isopropanol- and Water-3-Methoxybutanol-Mixtures (Initial Solution With 18% Water by Weight) As a Function of Evaporation Rate

PURIFICATION OF PHOSPHORIC ACID

The present invention relates to a process for purifying phosphoric acid, especially wet-processed phosphoric acid, wherein the phosphoric acid or an aqueous solution thereof is dissolved in an organic solvent completely miscible with water, the resulting solution is freed from undissolved matter and the phosphoric acid is recovered from the solution.

Various processes for the purification of phosphoric acid produced by subjecting crude phosphates to wet-processing treatment, wherein the phosphoric acid is extracted by means of organic solvents, have already been described in the art.

In those processes in which solvents immiscible or partially miscible with water are used, the phosphoric acid is absorbed together with more or less water in the extractant, the phosphoric acid contaminants being retained in the aqueous phase. As a result of the low distribution coefficients which prevail in such systems, it is necessary for the solvent to be used in large quantities and for the extraction to be effected as a multiple stage operation, so as to obtain satisfactory $H_3PO_4$ yields. In addition to this, in an attempt to obtain phosphoric acid of satisfactory purity, it is necessary for it to be subjected to a multiple stage countercurrent scrubbing operation.

In those cases in which solvents completely miscible with water, absorbing phosphoric acid together with the water, such as lower alcohols and ketones, are used, the phosphoric acid contaminants remain as a separate phase in the solvent, provided that the content of water therein is not excessively high. Depending on the particular solvent used, the quantity and nature of the contaminants, an aqueous solution or viscous mass or solid matter is found to precipitate.

As described in German Patent Specification 884,358, methanol and ethanol, which are more polar lower alcohols, as well as acetone should conveniently not be used as they effect the precipitation of the contaminants in the form of slimy material, which is difficult to separate. More favorable results have been described in German published Specification "Offenlegungsschrift" 1,952,104, which are obtained with the use of isopropanol or dioxane, wherein the contaminants concentrate as a separate aqueous phase. Especially isopropanol is the solvent used in further modified processes (Cf. German published Specification "Offenlegungsschrift" 2,029,602).

An adverse effect encountered in processes using solvents miscible with water resides in the complication that water is absorbed therein. The water affects the specific dissolving properties of the solvent which may even become deprived thereof. This in turn affects the selective separating power of the solvent and the purity of the resulting phosphoric acid. It is accordingly necessary by the use of pre-concentrated crude acids and anhydrous solvents to maintain the water in the extract at a rate as low as possible. Circulating the solvent is a principal requirement in dissolution and extraction processes so that it is definitely necessary for the extractant to be freed from the water contained therein, preferably by distillation, prior to reusing it. This is, however, not easy to achieve with the solvents used heretofore, such as isopropanol and dioxane. In known solvent/water-azeotropes, the conditions are so unfavorable that the azeotropes cannot be dehydrated by simple distillation. This is shown by the following data for the azeotropic mixtures at 1013 millibar (Azeotropic Data, L. H. Horsley, Publ. By Am. Chem. Soc. 1952).

Isopropanol: bp: 82.4° C
Isopropanol/water-azeotrope (87.4:12.6 weight %)
  bp: 80.3° C
Dioxane: bp: 101.3° C
Dioxane/water-azeotrope (82.0 : 18.0 weight %)
  bp: 87.8° C During distillation, an azeotrope enriched with solvent, first goes over, while water, which is to be removed, accumulates, and is retained, in the sump.

Still further known processes use solvents partially miscible with water. These solvents can more particularly be used in a form in which they are partially saturated with water, where they show a behaviour comparable to that of solvents immiscible with water, or in anhydrous form, where they sometimes behave similarly to solvents completely miscible with water.

This is, however, not fully satisfactory. Prior to using the solvent, it is necessary for it to be completely or partially dehydrated. In addition to this, the multi-stage extraction described produces a phosphoric acid-containing extract having considerable proportions of water therein which increases, the same way as water-miscible solvents, the power of the organic solvent for dissolving the impurities in crude phosphoric acid, especially iron sulfate and phosphate.

The present invention now unexpectedly provides a highly selective process for the extractive purification of phosphoric acid with the use of an organic solvent being completely miscible with water, which comprises mixing the phosphoric acid to be purified with a solvent in a ratio by volume within the range 1:0.3 and 1:30, the solvent having a boiling point higher than that of water or higher than that of the resulting water/solvent-azeotrope; heating the resulting solution to temperatures between the boiling point of water or the azeotrope and that of the solvent for as long a period as necessary to distillatively free the solution from the bulk of uncombined water therein; and separating the phosphoric acid solution from the resulting residue.

In carrying out the present process, it is particularly advantageous for the phosphoric acid which is to undergo purification and for the solvent to be mixed together in a ratio by volume between 1:1 and 1:4.

In order to intensify the precipitation of contaminants, especially foreign anions, it is good practice to use the phosphoric acid solution in the solvent in further admixture with one or more alkali metal compounds, which should preferably be employed in one to three times, based on the alkali metal cations, the quantity theoretically necessary to bind the foreign anions in the solution, the preferred alkali metal compounds being selected from the phosphates, carbonates, sulfates or hydroxides of sodium or potassium.

Improved yields of desirable phosphoric acid are obtained by admixing the impure phosphoric acid with up to about 8 weight%, based on $P_2O_5$, of sulfuric acid.

Losses of solvent are obviated by circulating the solvent, once the phosphoric acid has been recovered from the organic solution.

The residue remaining after separation of the phosphoric acid can be processed with sulfuric acid and the resulting mixture, which may be used in admixture with some water, can be thermally treated with the solvent the same way as the phosphoric acid, whereby the yield of desirable product is still further improved.

The phosphoric acid recovered from the processed residue should be recycled together with the solvent to the reaction zone.

It is also possible for the phosphoric acid solution separated from the residue to be recovered in the form of phosphates. To this end, the phosphoric acid solution is admixed with a concentrated aqueous solution of a basic compound with the resultant formation of two different liquid phases, and the solvent is separated from the phosphate-containing aqueous phase.

To this end, it is good practice to use the water distilled off from the phosphoric acid solution or the azeotropic mixture for preparing the aqueous solution of the basic compound.

The steps comprising admixing the solvent with the phosphoric acid and distilling off the water from the resulting mixture can be effected in a single stage operation, which may be termed a "dehydrating extraction," whereby operation is simplified considerably.

Useful solvents are all alcohols, glycols, ketones, esters and sulfur-containing compounds as well as suitable derivatives or mixtures of these solvents, which are miscible with water and dissolve phosphoric acid, e.g. sulfolane, dimethylsulfoxide, diethyleneglycol, ethyleneglycol-monoethylether, ethyleneglycol-monobutylether, diethyleneglycol-monobutylether, ethyleneglycolmonomethyletheracetate or N-methylpyrrolidone.

3-methoxybutanol is a particularly useful solvent. It has a high selective power for purifying phosphoric acid and it is easy for it to be kept free from water on regenerating it by distillation. 3-methoxybutanol is a commercial solvent which boils at 158° C and forms an azeotrope with water. The azeotrope contains 85 weight% of water and has a boiling point of 94° C. On concentrating the azeotrope by evaporation, water is predominantly distilled off and anhydrous 3-methoxybutanol remains behind. The changes which occur in the water content of a solution of 18 weight% of water in isopropanol and 3-methoxybutanol, respectively, are compared and plotted against the degree of evaporation, in the accompanying diagram (FIG. 2).

Figure 2:
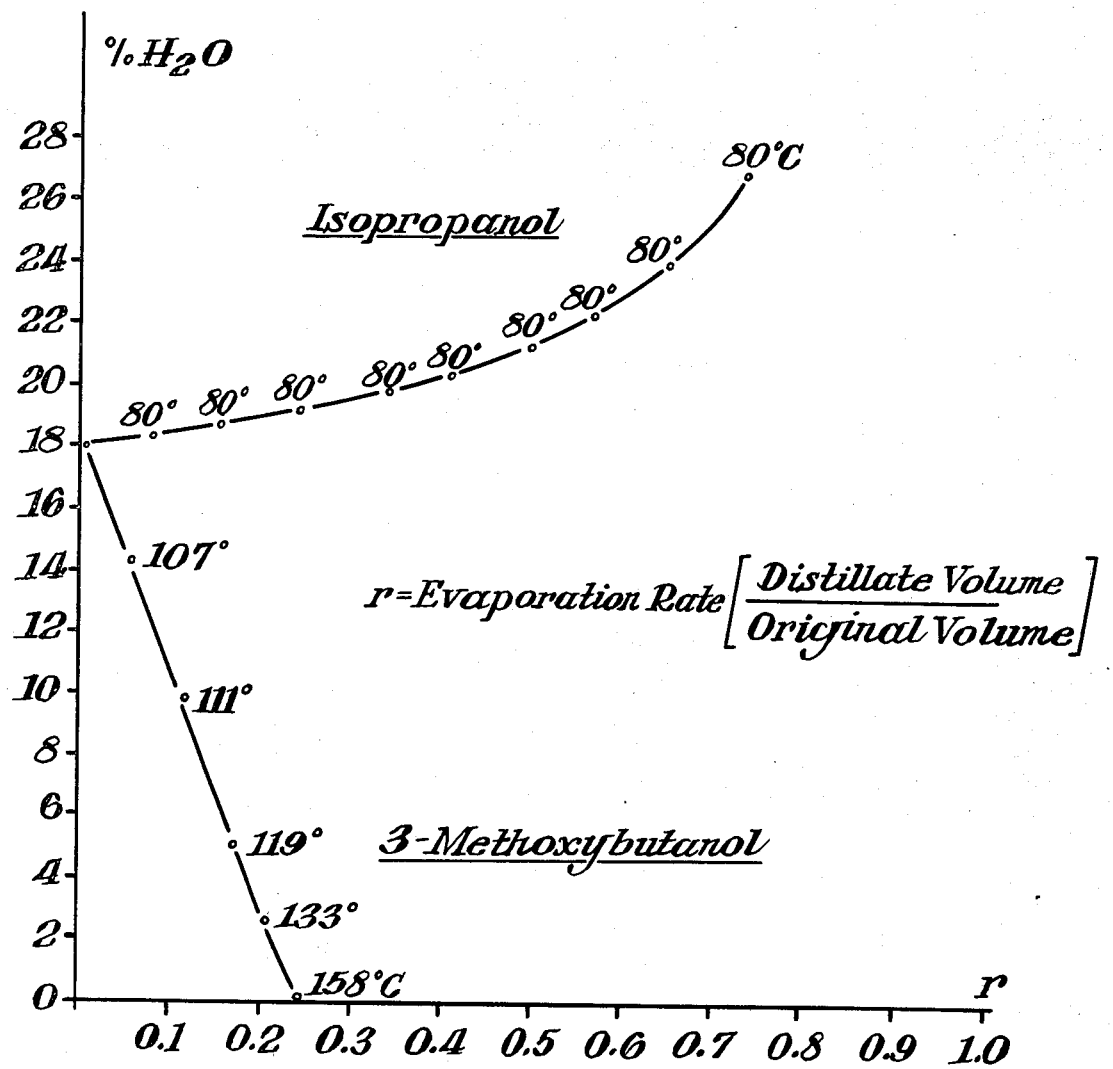

In FIG. 2, "r" represents the evaporation rate, which is the ratio of the quantity of distillate to the quantity of the starting mixture. As shown in FIG. 2, the solvent is obtained already free of water in the case of 3-methoxy butanol if only 24% of the original solvent and water mixture has been distilled off.

As can be seen, the water content in the distilling vessel increases continuously if isopropanol is used, whilst it decreases rapidly if methoxybutanol is used. The methoxybutanol is free from water after distillative removal of 24 weight%, or after removal by rectification of only 21 weight%, of the quantity initially used. As a result of the unexpected good selectivity of 3-methoxybutanol, it is even possible to avoid the distillative removal of water from the phosphoric acid solution in 3-methoxybutanol and to separate the solution directly from the residue.

Especially good separation effects are obtained by using the phosphoric acid in admixture with 3-methoxybutanol in a ratio by volume within the range 1:1 and 1:6.

The purification of the extract can be further improved by subjecting the phosphoric acid solution in 3-methoxybutanol to partial neutralization by means of one or more basic compounds so as to convert up to 20 weight% of the phosphoric acid to the dihydrogen phosphate stage, contacting the resulting aqueous phase with fresh phosphoric acid solution in 3-methoxybutanol flowing countercurrently with respect thereto, and thereby purifying the fresh solution, and recovering the phosphoric acid from the solution so purified. It is also possible for such partial phosphate formation to be effected fractionwise. In this case, the individual fractions are contacted with the extract in countercurrent manner.

The present process compares very favorably with the purification methods used heretofore in the use of 3-methoxybutanol, which is easy to regenerate and can be used over and over again in anhydrous form, so that it is possible for the high purifying power of the solvent to be substantially maintained.

The extracts obtained in the process of the present invention are substantially free from water and easy to separate from the solid crystalline precipitates by centrifugation or filtration. As a good deal of purified phosphoric acid is transformed into phosphates, it is advantageous for them to be prepared in the extract by admixing the latter with suitable basic compounds.

The unexpected beneficial effects of the present process are primarily due to the fact that the various reactions take place in a solvent/phosphoric acid-system which is substantially or completely free from water. As a result, the present process compares very favorably with the prior art methods in respect to the following points:

1. The purification is substantially unaffected by the concentration of the crude phosphoric acid.
2. The process avoids pretreatment of crude phosphoric acid, e.g. desulfatization and defluorination, which in turn entail difficult filtration.
3. The process avoids dehydration of the solvent.
4. The dissolution of phosphoric acid and the precipitation of contaminants can be effected in a single stage operation.
5. The production of highly concentrated organic phosphoric acid solutions is substantially unaffected by the concentration of the feed phosphoric acid.
6. The formation of high $P_2O_5$-yields is substantially not affected by the concentration of the crude acid and the content of water in the solvent.

An exemplary embodiment of the process of the present invention will now be described with reference to the accompanying flow scheme (FIG. 1).

As can be seen, contaminated crude phosphoric acid coming from a conduit 1 is delivered to a heatable agitator reactor A and admixed therein with solvent circulated through a conduit 8, at temperatures which are lower than the boiling point of the solvent but higher than the boiling point of water or the resulting azeotrope. The material in the reactor is further admixed, through a conduit 2, with alkali metal compounds which are added in proportions corresponding to the content of foreign anions, especially to the content of fluoride, in the phosphoric acid. Water is removed distillatively and the resulting suspended extract is delivered through a conduit 3 to a separator B, in which the precipitate having the contaminants therein is separated (through a conduit 9) from the pure extract travelling through a conduit 4. The extract travelling through conduit 4 can be treated in known manner to recover the phosphoric acid therefrom.

If the phosphoric acid is recovered in the form of phosphates, it is advantageous for the extract travelling through conduit 4 to be delivered to a container C, which may be an exchanger tube, and to be contacted therein with a solution made from a basic substance coming from a conduit 7, distilled water or azeotrope flowing through conduit 6. The preferred solution is an alkali metal hydroxide or carbonate solution. This effects the formation of phosphates and the formation of two different liquid phases, of which one contains the organic solvent, which is recycled to reactor A through conduit 8, and the other is the aqueous phosphate phase, which is the final product and discharged through conduit 5.

A modification of the operation just described provides for phosphate fractions, which are retained in the precipitate removed through conduit 9, to be recovered. To this end, the precipitate travelling through conduit 9 is delivered to a container D and processed therein with sulfuric acid coming from a conduit 10. The processed material is conveyed through a conduit 11 to a further reactor A', admixed therein with solvent coming from conduits 8 and 8' and the whole is treated the same way as the initial feed material. The resulting distillate travelling through a conduit 6' may be united with the principal distillate flowing through conduit 6, the suspended extract flowing through a conduit 3' can be delivered to a further separator B' and separated therein into precipitate containing the contaminants, which travels through conduit 9', and into an extract, which is recycled to reactor A, through conduit 4'.

The following Examples illustrate the invention.

EXAMPLE 1

The starting material was crude phosphoric acid prepared by subjecting Kola phosphate to wet-processing treatment with sulfuric acid. After separation of $CaSO_4$, the acid contained 28.2% of $P_2O_5$ (of which 85% was in the form of $H_3PO_4$) and the following principal contaminants: 0.71% of iron, 0.91% of aluminum, 0.83% of sulfate and 2.7% of fluoride, based on $P_2O_5$. 1 kg of the crude acid was admixed with 1.4 kg of 3-methoxybutanol (ratio by volume = ½) and the mixture was heated up to 135° C in an agitator reactor having a packed column mounted thereon. The distillate (0.65 kg) which contained the water originating from the crude acid and methoxybutanol distilled off azeotropically, was collected. The suspended extract was cooled and precipitate (75 g containing 56.2% of $P_2O_5$) was separated therefrom. The clear extract (1.675 kg, of which 0.24 kg was $P_2O_5$) contained 85% of the overall $P_2O_5$ or 100% of the acid used. The purifying power of the dehydrating extraction can be demonstrated best on the evidence of the purifying factors (PF) determined for iron and sulfate (PF = relation of contaminants in crude acid, based on $P_2O_5$, to contaminants in extract, based on $P_2O_5$). The purification factors determined for Fe and $SO_4$ were 73 and 70, respectively. The clear extract was admixed with a liquor of 0.135 kg of caustic soda and 0.18 kg of distillate so as to effect the formation of $NaH_2PO_4$. Methoxybutanol, which was separated upon the dissolution of the caustic soda in the distillation azeotrope, was recycled. During the formation of $NaH_2PO_4$, the extract underwent separation into two phases, of which one contained the methoxybutanol together with residual minor proportions of $P_2O_5$ (2 g). The solvent was recycled to avoid loss of such $P_2O_5$. The other phase was a saturated $NaH_2PO_4$-solution which solidified after a short period of time while forming $NaH_2PO_4$ hydrate crystals. 0.238 kg of the $P_2O_5$ was obtained as $Na_2HPO_4$, in this manner. This corresponded to a yield of 99%, based on the content of $P_2O_5$ in the extract. The phosphate so obtained was analyzed to determine its purity. It contained the following impurities in parts by million (ppm):

| Fe | 98 | $SO_4$ | 120 |
|----|----|----|-----|
| Al | 88 | F | 3400 |

The bulk of residual phosphate (42 g), which was chemically combined with the contaminants retained in the residue, was recovered. To this end, it was necessary for the residue to be processed with $H_2SO_4$ and extracted, while water was distilled off. The residue (75 g) was more particularly made into a paste with the use of 90 g of $H_2SO_4$. After reaction, the whole was admixed with 50 g of water, thoroughly stirred, admixed further with 310 g of methoxybutanol and dehydrated by heating it up to 135° C. After cooling, the precipitate was filtered off and recycled. The extract contained 40 g of $P_2O_5$ and 0.65 g of iron and 11 g of sulfate contaminants. It was recycled together with crude acid to the main reactor. In this manner, it was possible for the loss of $P_2O_5$ to be reduced down to less than 1%, based on the $P_2O_5$ in the crude acid.

In parallel tests, phosphoric acid made from Kola phosphate and methoxybutanol were mixed together in the quantitative ratio indicated above, but the water was only partially distilled off. The purification factors determined for iron and sulfate were 9.7 and 18.9, respectively, upon the distillative removal of 35% of water. They increased to 29.5 and 59.5, respectively, upon the distillation removal of 66% of water. In other words, it is possible for the purification power to be graded by partial distillative removal of the water.

EXAMPLE 2

Crude phosphoric acid prepared from Negev phosphate processed with sulfuric acid was used. The crude phosphoric acid contained 56.2% of $P_2O_5$ and the following principal contaminants, based on $P_2O_5$; 0.39% of iron, 0.29% of aluminum, 7.3% of sulfate and 1.2% of fluoride. 1 kg of the crude acid was admixed with 7 g of $SiO_2$ (to react the fluoride), 32 g of $Na_2CO_3$ and 21 g of $K_2CO_3$, and the mixture was subjected to extractive dehydration with 1.11 kg of methoxybutanol, in the manner described in Example 1. 0.21 kg of distillate, 0.138 kg of precipitate (of which 31% was $P_2O_5$) and 1.803 kg of extract containing 0.482 kg of $P_2O_5$, were obtained. To obtain $NaH_2PO_4$, the extract was admixed with a liquor consisting of 272 g of NaOH, the overall distillate and 120 g of water. The methoxybutanol phase, which still contained 5 g of $P_2O_5$, was recycled. The aqueous phase containing 0.478 kg of $P_2O_5$ in the form of $NaH_2PO_4$ solidified after a short period of time with hydrate formation. $P_2O_5$ was obtained in a yield of 91%, based on the content of $P_2O_5$ in the crude acid. The final product contained the following impurities, in ppm, based on $P_2O_5$:

| Fe | 106 | $SO_4$ | 2400 |
|---|---|---|---|
| Al | 58 | F | 3400 |

Residual phosphate in the impurities retained in the precipitate was recovered. To this end, the residue (138 g) was processed with 83 g of concentrated $H_2SO_4$. After cooling, the whole was stirred with 50 cc of water and subjected to extractive dehydration by means of 330 g of methoxybutanol. The extract freed from precipitate contained 36 g of $P_2O_5$ and 0.2 g of iron and 11.5 g of sulfate as impurities. It can be recycled together with crude acid to the main reactor. In this manner, it is possible for the loss of $P_2O_5$ to be reduced down to 1.3%, based on the content of $P_2O_5$ in the crude acid.

EXAMPLE 3

Crude phosphoric acid prepared from Moroccan phosphate processed with sulfuric acid was used. After separation of $CaSO_4$, the crude phosphoric acid contained 30.0 weight% of $P_2O_5$, and the following principal impurities, based on $P_2O_5$:

0.57% of iron
0.58% of aluminum
6.5% of sulfate and
3.6% of fluoride.

1 kg of the crude acid was mixed with 20 g of $Na_2CO_3$, 13 g of $K_2CO_3$ and 7 g of $SiO_2$ and the mixture was subjected to extractive dehydration with 1.38 kg of methoxybutanol. The precipitate containing the impurities was separated. There were obtained: 1.680 kg of extract containing 270 g of $P_2O_5$, 619 g of distillate and 110 g of precipitate (of which 27.9% was $P_2O_5$). To obtain $NaH_2PO_4$, the extract was mixed with a liquor of 150 g of NaOH and 191 g of distillate. The aqueous phase was separated. It solidified after a short period of time with formation of a $NaH_2PO_4$-hydrate. $P_2O_5$ was obtained in a yield of 88.5%, based on the $P_2O_5$ in the crude acid. It contained the following impurities, in ppm, based on $P_2O_5$:

| Fe | 63 | $SO_4$ | 880 |
|---|---|---|---|
| Al | 33 | F | 2500 |

The methoxybutanol phase which still contained 4 g of $P_2O_5$ was recycled.

Residual phosphate contained in the precipitate was recovered. To this end, the precipitate (110 g) was processed with 64 g of concentrated $H_2SO_4$. After cooling, 60 cc of water was added and the whole was subjected to extractive dehydration by means of 265 g of methoxybutanol. The extract freed from precipitate contained 26 g of $P_2O_5$ and 0.5 g of Fe and 13 g of sulfate impurities. It can be recycled together with crude acid to the main reactor. In this manner, it is possible for the loss of $P_2O_5$ to be reduced down to 1.35%, based on the $P_2O_5$ in the crude acid.

EXAMPLE 4

Various solvents were tested as to their power for purifying crude phosphoric acid in a series of tests under comparable conditions. The crude acid was prepared from Kola phosphate processed with sulfuric acid, and met the specification set forth in Example 1.

The purifying power was determined on the evidence of the changes in the content of iron and sulfate, based on $P_2O_5$. Iron and sulfate are typical impurities of wet-processed phosphoric acid, and their behaviour enables conclusions to be drawn as to further undesirable impurities. The tests were made on the extractive dehydration as the step which is characteristic of the present process. The separation of hydrogen phosphate was not pursued. It can be effected in the manner described in the Examples herein. The solvent and wet-processed acid were used in a ratio by volume of 2:1 to have comparable conditions and the tests were carried out in the manner specified in Example 1. The results obtained are indicated in the following Table.

TABLE

| Solvent | Wgt % $P_2O_5$ in extract | Fe, based on $P_2O_5$, in ppm | $SO_4$, based on $P_2O_5$, in ppm |
|---|---|---|---|
| Diethyleneglycol | 12.7 | 4130 | 2410 |
| Ethyleneglycolmono-ethylether | 14.2 | 2070 | 547 |
| Ethyleneglycolmono-butylether | 15.8 | 1870 | 1490 |
| Diethyleneglycolmono-butylether | 13.3 | 2700 | 1230 |
| Ethyleneglycolmono-methyletheracetate | 14.0 | 2029 | 1787 |
| N-methylpyrrolidone | 12.6 | 560 | 4800 |

The operational conditions selected in the Examples herein are in no way intended to limit the present process thereto, which can be carried out continuously or intermittently. The same is true concerning the accompanying flow scheme which is given by way of Example only to illustrate the invention. It is also not necessary for the alkali liquors necessary to effect the phosphate formation to be used in the concentration specified herein, for example if dilute acids are used and larger quantities of distillate are obtained, which are recycled to recover the solvent therein, or if it is desirable for phosphate solutions to be produced in the place of solid hydrates. It is also possible for the phosphoric acid to be neutralized beyond the dihydrogen phosphate stage so as to produce other salts, such as potassium and ammonium salts. To recover the phosphate in the precipitate, it is possible for the $H_2SO_4$ quantity to be varied and adapted to a certain sulfate recycle quantity, depending on the content of $P_2O_5$ and the impurities in the precipitate.

EXAMPLE 5

Crude phosphoric acid from Morrocan phosphate processed with sulfuric acid was used. After separation of $CaSO_4$, the crude phosphoric acid contained 30.0 weight % of $P_2O_5$ and the following principal impurities, in weight %, based on $P_2O_5$:

| 0.57 % of iron | 6.5 % of sulfate |
|---|---|
| 0.58 % of aluminum | 3.6 % of fluoride |

1 kg of the crude acid was mixed with 20 g of $Na_2CO_3$, 13 g of $K_2CO_3$ and 7 g of $SiO_2$ and further admixed with 2.77 kg of 3-methoxybutanol. Precipitated impurities (94 g after drying, of which 21 g was $P_2O_5$) were separated. To effect the formation of $NaH_2PO_4$, the clear solution was mixed with a liquor made from 158 g of NaOH and 175 g of distillate obtained upon subjecting the methoxybutanol to dehydration. The solution so treated was found to separate into two phases. The upper phase contained methoxybutanol together with a portion of water and the lower phase contained $NaH_2PO_4$ in aqueous solution. After evaporation and drying, there were obtained 469 g of $NaH_2PO_4$ (= 277.5 g of $P_2O_5$). This corresponded to a yield of 92.5 weight %, based on the $P_2O_5$ in the crude acid. The phosphate contained the following impurities, in ppm, based on $P_2O_5$: 129 ppm of iron; 48 ppm of aluminum; 1.3 weight % of sulfate and 220 ppm of fluoride. This gave the following purifying factors (relation of impurity in crude acid, based on $P_2O_5$, to impurity in final product, based on $P_2O_5$): PF iron = 44; PF aluminum = 121; PF sulfate = 5 and PF fluoride = 164. The methoxybutanol phase (3.31 kg containing 16 weight % of water) was dehydrated distillatively in a small rectifying column (30 cm silver jacketed column packed with Raschig rings). 2.70 kg of anhydrous methoxybutanol was recovered in this manner and recycled. The distillate was used for making sodium hydroxide solution.

EXAMPLE 6

Crude phosphoric acid made from Kola phosphate processed with sulfuric acid was used. After separation of $CaSO_4$, it contained 28.2 weight % of $P_2O_5$ and the following principal contaminants, based on $P_2O_5$: 1.0 weight % of sodium; 0.71 weight % of iron; 0.91 weight % of aluminum; 0.83 weight % of sulfate and 2.7 weight % of fluoride. 1 kg of the crude acid was mixed with 2.80 kg of 3-methoxybutanol. The impurities were found to precipitate. After separation of the precipitate (dry weight = 49 g, of which 24 g was $P_2O_5$), the phosphoric acid was transformed to dihydrogen phosphate by admixing the methoxybutanol solution with 146 g of NaOH dissolved in 162 g of water. The methoxybutanol was found to separate from the aqueous phosphate phase, which was evaporated. The $NaH_2PO_4$ was dried and weighed. It was obtained in a yield of 433 g (90.8 weight %) and contained 190 ppm of iron, 300 ppm of aluminum, 280 ppm of sulfate and 270 ppm of fluoride, based on $P_2O_5$. This corresponded to the following purifying factors:

| iron | 37 | sulfate | 29 |
|---|---|---|---|
| aluminum | 30 | fluoride | 100 |

The methoxybutanol phase (3.37 kg containing 17 weight % of water) was dehydrated in the manner described in Example 1 and gave 2.69 kg of anhydrous methoxybutanol which was re-used.

EXAMPLE 7

Crude phosphoric acid prepared from Negev phosphate processed with sulfuric acid was used. The crude phosphoric acid contained 52.6 weight % of $P_2O_5$ and the following principal contaminants, in weight %, based on $P_2O_5$:
0.39 iron,
0.29 aluminum,
7.3 sulfate and
1.2 fluoride 1 kg of the crude acid was mixed with 32 g of $Na_2CO_3$, 21 g of $K_2CO_3$ and 7 g of $SiO_2$ and admixed further with 2.22 kg of 3-methoxybutanol. The contaminants which precipitated (132 g of which 44 g was $P_2O_5$) were separated. Phosphoric acid dissolved in the methoxybutanol was transformed to $NaH_2PO_4$ by the addition of a sodium hydroxide solution consisting of 272 g of NaOH and 302 g of distillate originating from the dehydration of methoxybutanol. After separation of the phases, the aqueous phosphate phase was removed from the methoxybutanol phase, evaporated and dried and 811 g of $NaH_2PO_4$ was obtained (this corresponded to a yield of 91.2 weight %). The phosphate contained 173 ppm of iron, 76 ppm of aluminum, 1.18 weight % of sulfate and 290 ppm of fluoride, based on $P_2O_5$. The following purification factors were determined:

| PF iron 23 | PF sulfate 6.2 |
|---|---|
| PF aluminum 38 | PF fluoride 41 |

The methoxybutanol phase (2.46 kg) was dehydrated in the manner described in Example 1 and 2.21 kg of anhydrous methoxybutanol was recovered, which was reused.

In a parallel test, 1 kg of the above crude acid prepared from Negev phosphate was admixed with the above quantities of $Na_2CO_3$, $K_2CO_3$ and $SiO_2$, but with only 1.11 kg of 3-methoxybutanol. After separation of the precipitate (110 g, of which 36 g was $P_2O_5$), a portion of the phosphoric acid in methoxybutanol was transformed to $NaH_2PO_4$ by the addition of sodium hydroxide solution (55 g of NaOH in 178 g of water) and purified thereby. The resulting phosphate was found to separate from the methoxybutanol solution while forming a separate aqueous phase. Such partial neutralization caused the bulk of the contaminants to appear in the aqueous phosphate phase, which was separated. Following this, the purified phosphoric acid was transformed to $NaH_2PO_4$ by means of sodium hydroxide solution (221 g of NaOH in 245 g of water). After separation of the aqueous phase together with the purified phosphate from the methoxybutanol, the whole was evaporated and precipitated $NaH_2PO_4$ was dried (660 g). The content of iron and sulfate, respectively, which is typical of cationic and anionic contaminants, was found to have been reduced to 38 ppm of iron and 1880 ppm of sulfate, respectively, based on $P_2O_5$. This corresponded to an overall purification factor of 102 for iron and of 38 for sulfate. Despite the fact that considerably less methoxybutanol was added, the purification was significantly improved.

EXAMPLE 8

Crude phosphoric acid prepared from Moroccan phosphate containing 30.4 weight % of $P_2O_5$ and 2 weight % of fluoride was used. To be freed from the fluoride therein, the crude acid was admixed with 2.5 g/kg of $SiO_2$ and 20.5 g/kg of $Na_2CO_3$ and precipitated sodium silico fluoride was filtered off. The crude acid so obtained contained 0.394 g of $P_2O_5$ per cc and 2.2 mg/cc of iron and 24 mg/cc of sulfate as the principal contaminants. An extractive mixing settler comprising 11 individual stages was supplied per minute with 2 cc of crude acid and 4 cc of 3-methoxybutanol, which were introduced into the first stage, and with 0.15 cc of sodium hydroxide solution (260 g of NaOH/l), which was introduced into the 11th stage. The partial neutralization, which occurred in stage 11, caused the bulk of contaminants to appear in a newly forming phosphate phase, which was caused to travel counter-currently to the methoxybutanol/phosphoric acid solution and which was taken from the extractor through stage 1 together with contaminants precipitating therein. The methoxybutanol phase containing purified phosphoric acid was discharged from stage 11. It contained 0.122 g of $P_2O_5$/cc and it was admixed with 0.1 cc/cc of sodium hydroxide solution (700 g of NaOH/1). The $NaH_2PO_4$-phase which precipitated was separated from methoxybutanol, the water was evaporated and the $NaH_2PO_4$ was dried. 1.232 g of $NaH_2PO_4$ was obtained per minute. This corresponded to a $P_2O_5$-yield of 92.6 weight %. The content of iron and sulfate, respectively, in the phosphate was found to have been reduced to 15 ppm and 120 ppm, respectively, based on $P_2O_5$. The purification factors determined for iron and sulfate were 370 and 510, respectively. The methoxybutanol contained 17 weight % of water. It was dehydrated in the manner described hereinabove and re-used.

We claim:

1. A process for purifying impure aqueous phosphoric acid containing dissolved impurities, wherein the said phosphoric acid is mixed with an organic solvent completely miscible with water, the resulting organic phosphoric acid solution is separated from precipitated residue containing said impurities and phosphoric acid is recovered from the said solution, which comprises mixing in a mixing zone the impure aqueous phosphoric acid in a ratio by volume within the range 1 : 0.3 and 1 : 30, with an organic solvent selected from the group consisting of sulfolane, dimethylsulfoxide, diethyleneglycol, ethyleneglycol- monoethylether, ethyleneglycolmonobutylether, diethyleneglycolmonobutylether, ethyleneglycolmonomethyletheracetate, N-methylpyrrolidone and 3-methoxybutanol, heating the resulting mixture to its boiling point for as long a period as necessary to distil off essentially all of the free water contained therein; and separating the resulting organic phosphoric acid solution from the precipitated residue and recovering purified phosphoric acid from the organic phosphoric acid solution.

2. The process as claimed in claim 1, wherein the impure aqueous phosphoric acid and the organic solvent are mixed together in a ratio by volume within the range 1 : 1 and 1 : 4.

3. The process as claimed in claim 1, wherein the mixture of phosphoric acid and the organic solvent is further admixed with alkali metal phosphates, carbonates or hydroxides in amounts one to three times the quantity theoretically necessary to precipitate the anions of the impurities contained in the phosphoric acid, based on the alkali metal cations.

4. The process as claimed in claim 1, wherein the organic solvent is recycled to the mixing zone after the organic phosphoric acid solution is free from the phosphoric acid by reextraction with water or neutralization with alkali metal hydroxides or carbonates.

5. The process as claimed in claim 1, wherein the precipitated residue obtained is mixed with sulfuric acid and the resulting impure aqueous mixture is added to the phosphoric acid to be purified.

6. The process as claimed in claim 1, wherein the organic solvent is mixed with the impure aqueous phosphoric acid and the water is distillatively removed from the resulting mixture, in a single stage operation.

* * * * *